United States Patent [19]
Fujita et al.

[11] Patent Number: 5,980,012
[45] Date of Patent: *Nov. 9, 1999

[54] RECORDING APPARATUS AND INK JET RECORDING METHOD

[75] Inventors: Miyuki Fujita, Tokyo; Shigeyasu Nagoshi, Yokohama; Toshiharu Inui, Yokohama; Yuji Akiyama, Yokohama; Masaya Uetsuki, Yokohama; Hidehiko Kanda; Akitoshi Yamada, both of Kawasaki, all of Japan

[73] Assignee: Canon Kabushiki Kaisha, Tokyo, Japan

[ * ] Notice: This patent issued on a continued prosecution application filed under 37 CFR 1.53(d), and is subject to the twenty year patent term provisions of 35 U.S.C. 154(a)(2).

[21] Appl. No.: 08/758,346

[22] Filed: Dec. 3, 1996

[30] Foreign Application Priority Data

Dec. 5, 1995 [JP] Japan .................................. 7-316443

[51] Int. Cl.⁶ ........................................................ B41J 2/07
[52] U.S. Cl. .................................................. 347/5; 347/15
[58] Field of Search .................................. 347/15, 5, 14, 347/19

[56] References Cited

U.S. PATENT DOCUMENTS

| | | |
|---|---|---|
| 4,198,642 | 4/1980 | Gamblin . |
| 4,313,124 | 1/1982 | Hara . |
| 4,345,262 | 8/1982 | Shirato et al. . |
| 4,459,600 | 7/1984 | Sato et al. . |
| 4,463,359 | 7/1984 | Ayata et al. . |
| 4,558,333 | 12/1985 | Sugitani et al. . |
| 4,723,129 | 2/1988 | Endo et al. . |
| 4,740,796 | 4/1988 | Endo et al. . |
| 4,920,355 | 4/1990 | Katerberg . |
| 5,010,497 | 4/1991 | Shimada . |
| 5,189,440 | 2/1993 | Takakuwa et al. ................. 346/76 PH |
| 5,204,704 | 4/1993 | Genno et al. ........................ 346/76 PH |
| 5,500,661 | 3/1996 | Matsubara et al. . |
| 5,535,311 | 7/1996 | Zimmerman ............................ 395/114 |

FOREIGN PATENT DOCUMENTS

| | | |
|---|---|---|
| 0 580 376 | 1/1994 | European Pat. Off. . |
| 0 622 758 | 11/1994 | European Pat. Off. . |
| 59-123670 | 7/1984 | Japan . |
| 59-138461 | 8/1984 | Japan . |

*Primary Examiner*—John Hilten
*Attorney, Agent, or Firm*—Fitzpatrick, Cella, Harper & Scinto

[57] ABSTRACT

This invention relates to an ink jet recording apparatus and a recording method for recording images of high dignity with the amount of ink placed per unit area of a recording medium being always kept constant even if the resolvability when recording is effected changes. When the amount of ink of an ink droplet discharged from a recording head is constant (25 pl), the average number of recorded dots conformity to the resolvability is found on the basis thereof, and the number of recordable dots is found from this average number of dots. The difference between this number of actually recorded dots and the average number of recorded dots is adjusted by reducing the value of recording data in advance.

10 Claims, 9 Drawing Sheets

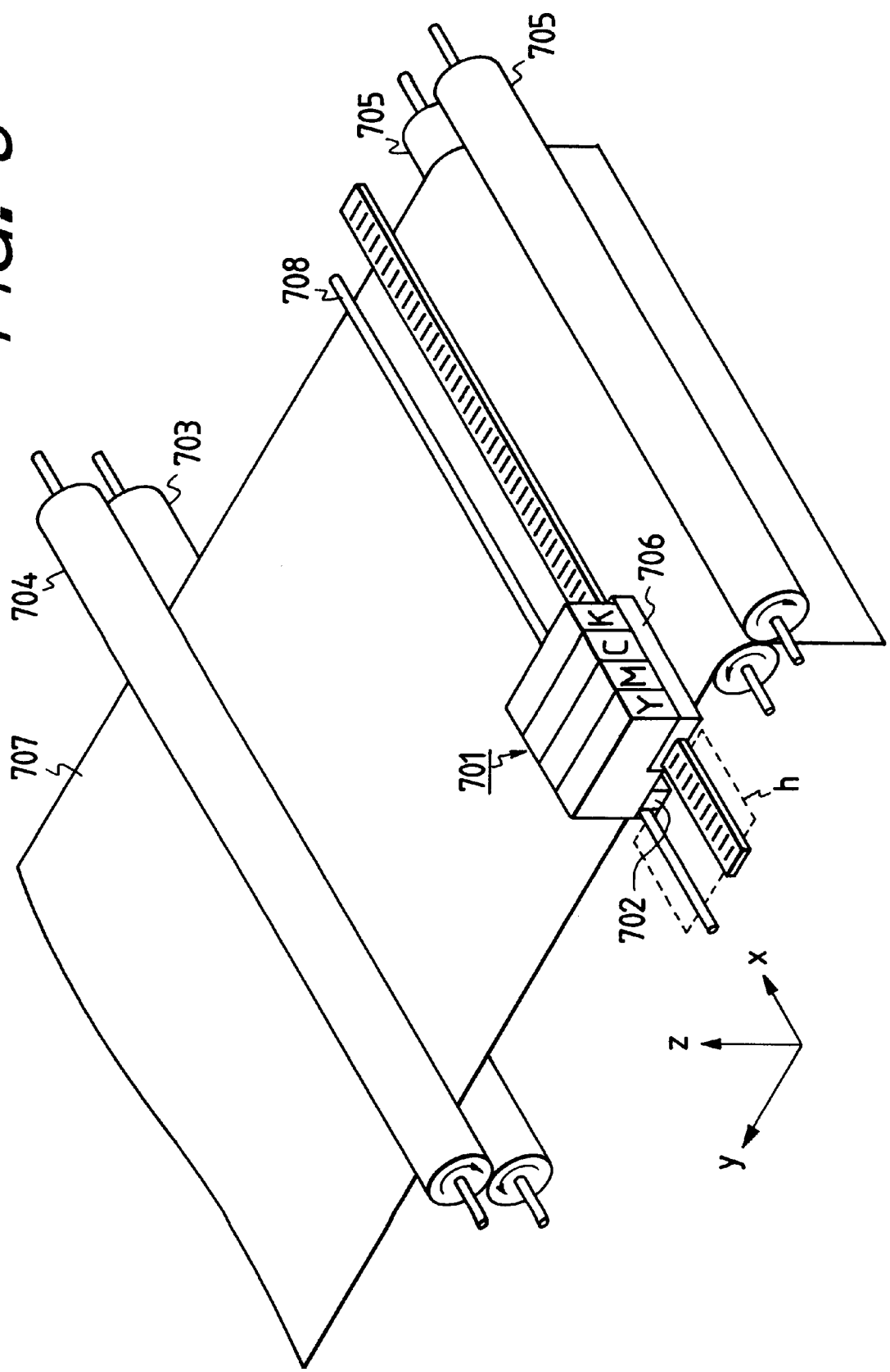

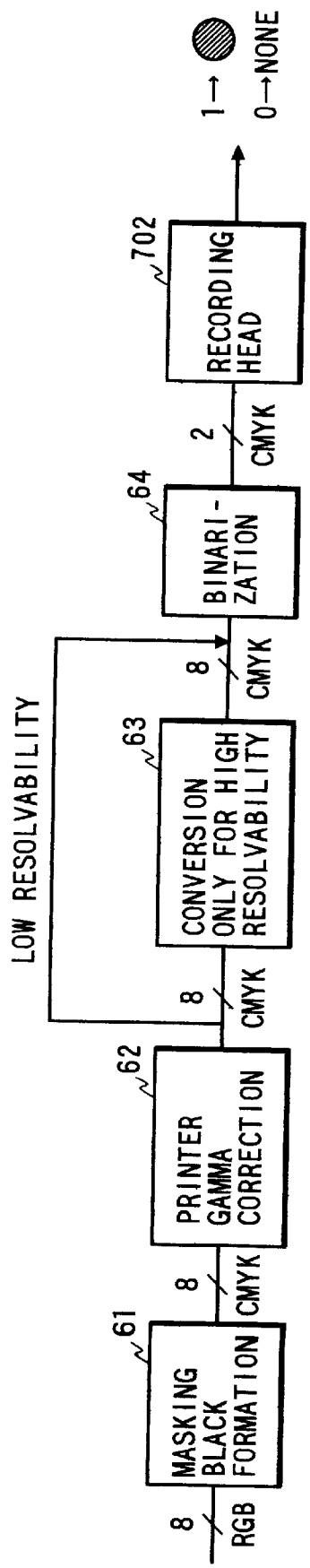

RECORDING APPARATUS AND INK JET RECORDING METHOD

BACKGROUND OF THE INVENTION

1. Field of the Invention

This invention relates to a recording apparatus and an ink jet recording method, and particularly to a recording apparatus and a recording method in which recording can be effected in a plurality of resolvability or resolution modes.

2. Related Background Art

With the spread of copying apparatuses, information processing apparatuses such as word processors and computers and further, communication apparatuses such as facsimile apparatuses, apparatuses for effecting digital image recording by an ink jet system have spread as one type of image forming (recording) apparatuses for outputting information processed in those apparatuses as characters and images. In recent years, it has been rapidly contrived to cope with effecting recording of higher resolvability to meet the demand for the higher quality of recorded images.

In such an ink jet recording apparatus, generally with a view to improve the recording speed, a recording head having a plurality of ink discharge ports and liquid paths integrated is used as a recording head comprising a plurality of recording elements integrated and arranged. However, the integration density of the ink discharge ports is limited for a reason in the manufacture or the like and therefore, it is the present situation that the resolvability required in recent years cannot be coped with by the construction of the recording head like that heretofore available. In contrast, there have already been proposed various recording methods for effecting recording of high resolvability by the use of a recording head of relatively low resolvability.

Xerox Disclosure Journal, March/April 1979, vol.4, No. 2 shows a method of forming an image by the recording scanning of a head having nozzles (ink discharge ports) arranged at a pitch $\lambda$ and paper feeding of n+½ $\lambda$ (n being an integer). This can form an image in which the pixel pitch is ½ $\lambda$, i.e., an image of double resolvability, by the use of a recording head in which the nozzle pitch is $\lambda$. That is, what is written clearly in this literature is the most basic technique for obtaining an image of higher resolvability by effecting interlace recording several times by the use of a head of low resolvability.

In contrast with this, U.S. Pat. No. 4,198,642 by Mead Corporation and U.S. Pat. No. 4,920,355 by Eastman Kodak are mentioned as what specifically show the construction as a recording apparatus. According to the former, the nozzle interval is Kp and the number of nozzles is n for the recorded pixel interval q, and K and n are prime integers greater than 1, whereby an image can be recorded having resolvability k times as great as the nozzle pitch by a predetermined amount of paper feeding and the repetition of recording scanning. Also, according to the latter, when recording is effected by the use of A nozzles disposed at 2-pixel pitch, there is clearly written that A is an even number and a method in which an image is formed by the repetition of (A–1) pixels and (A+1) pixels for the amount of paper feeding in each recording scanning cycle, and here is realized resolvability double the nozzle pitch.

These cases are common in that the gap of the recording interval of each nozzle in one recording scanning cycle is made up for by a plurality of cycles of recording scanning and a particular amount of paper feeding, that is, interlace recording is effected, and an image of higher resolvability than the resolvability of the head in use can be realized.

However, when recording of high resolvability is done by the method of each of the above-described examples of the prior art, the time required for the data processing for interlace recording and the time required for the recording itself are apt to become long. Particularly in the case of data such as characters which do not require a high quality of image, time is meaninglessly consumed for the processing and recording thereof. Therefore, it is also known to further provide a low resolvability mode in which recording is effected at the same degree of resolvability as the nozzle pitch attaching importance to throughput, discretely from a high resolvability recording mode which realizes resolvability greater (greater than double) than the nozzle pitch (the pitch of the discharge ports).

Now, in a case where a plurality of resolvability modes are set as described above, when the resolvability is changed by mode changeover, the size of a pixel to be recorded is also changed, but in such a case, from the viewpoint of the dignity of recording or the like, it is desirable that the diameter of a dot can be adjusted in conformity with the size of the pixel. In the case of the ink jet system, however, it is difficult in terms of the structure thereof to change the size of each ink droplet discharged from each discharge port of a recording head within a range conforming to a change in the size of the pixel. Usually, in an ink jet recording apparatus corresponding to predetermined resolvability, the amount of ink discharge is designed in conformity with the predetermined resolvability. For example, when said predetermined resolvability is 360 dpi as shown in FIG. 1A of the accompanying drawings, the size of the dot diameter on the surface of paper is set to such a degree of discharge amount that completely covers a pixel, i.e., an area of 70.5 $\mu$m square.

However, if recording of 720 dpi is done with this setting of the discharge amount kept, four dots of the same size as in the case of 360 dpi are formed on the same area as the above-mentioned pixel as shown in FIG. 1B of the accompanying drawings, and the number of recorded dots, i.e., the amount of ink placement, per unit area becomes four times as great as that in the case of 360 dpi. If recording of 720 dpi is thus done when the design of the discharge amount corresponds to 360 dpi, the amount of ink placement will become excessively great and this may cause the deterioration of image in respect of the flow or the like by more ink than necessary. It may also cause the problem that image density and harmony differ greatly depending on resolvability.

In contrast with this, in a prior-art ink jet recording apparatus corresponding to a plurality of resolvability modes, there is adopted a method of setting the discharge amount to a value smaller than a discharge amount suitable for the low resolvability mode and greater than a discharge amount suitable for the high resolvability mode, and recording a plurality of dots for a recording pixel after binarization in the low resolvability mode and regularly thinning (e.g. checkerwise) pixels arranged on the surface of paper in the high resolvability mode to thereby reduce the number of dots formed in unit area. It is known that by doing so, the amount of ink placement is kept substantially constant without resorting to resolvability.

However, there is also a case where depending on the recording medium used, it is inappropriate to change the number of ink droplets uniformly placed into each pixel (the number of dots formed) in conformity with resolvability. For example, there has been a case where sufficient density is not obtained even if a dot or n dots are formed for a pixel and at the same time, the amount of ink placement becomes excessively great to cause the deterioration of image such as the blur of ink when two dots or (n+1) dots are formed for a pixel, and there has also been a case where it is difficult to determine the optimum number of dots for a pixel conforming to resolvability.

Particularly, when a colored image is to be recorded, in addition to the above-described change in the number of dots conforming to resolvability, it is necessary to record dots of two or more colors for a pixel when secondary colors such as red, green and blue are to be recorded, and in such a case, sufficient density is not obtained in a monochromatic image unless two or more dots are recorded for a pixel and on the other hand, the amount of ink placement may sometimes become excessive if for example, two dots are recorded in a mixed-color portion wherein secondary colors are recorded as described above.

SUMMARY OF THE INVENTION

The present invention has been made in view of the above-noted problems and the object thereof is to provide a recording apparatus and an ink jet recording method which can accurately and efficiently realize desired amounts of ink placement conforming to resolvability, recording medium and ink color, respectively.

For this purpose, according to the present invention, a recording apparatus using a recording head to effect recording on a recording medium is characterized by the provision of multi-value correction conversion means for reducing the value of multi-value density data, binarizing means for binarizing the multi-value density data of which the value has been reduced by the multi-value correction conversion means, and head drive control means for producing the discharge data of the recording head in relation to the reduction rate by the multi-value correction conversion means on the basis of the binarized data obtained by the binarizing means.

Also, an ink jet recording method using a recording head discharging ink to effect recording on a recording medium is characterized by the steps of finding the average number of recorded dots per predetermined area on the recording medium in conformity with at least one of resolvability, the kind of the recording medium and the color of the ink on the basis of the amount of ink of an ink droplet discharged from the recording head, finding the actual number of dots recordable by the recording head from the found number of dots, and reducing the value of recording data to adjust the difference between the actual number of recorded dots and the average number of recorded dots.

According to the above-described construction, the discharge data is produced in relation to the reduction rate of the multi-value density data and therefore, the amount by which the value of the data has become smaller can be made up for by the number of dots recorded, whereby the number of dots can be changed, for example, in conformity with the size of a pixel changed by resolvability and also, a uniform amount of ink placement (an amount of ink imparted) per unit area can be maintained even if the resolvability changes.

BRIEF DESCRIPTION OF THE DRAWINGS

FIG. 3 is a perspective view schematically showing an ink jet printer according to an embodiment of the present invention.

FIG. 5 is a block diagram for illustrating the concept of data processing in a high resolvability mode in the first embodiment.

DESCRIPTION OF THE PREFERRED EMBODIMENTS

Some embodiments of the present invention will hereinafter be described in detail with reference to the drawings.
(First Embodiment)

Figure 1A:
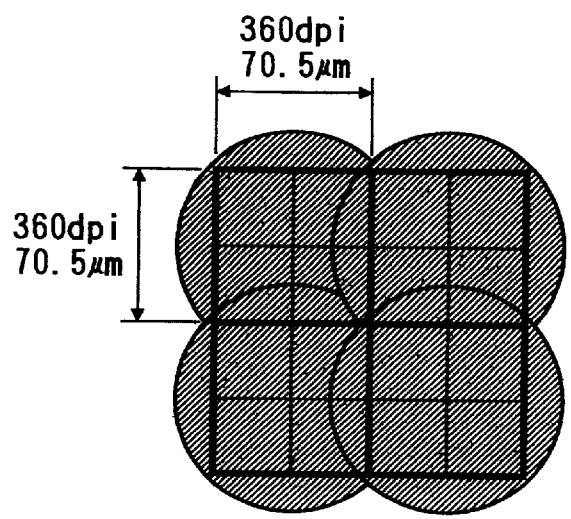
FIGS. 1A and 1B schematically show recorded dots by the conventional resolvability of 360 dpi.
Figure 1B:
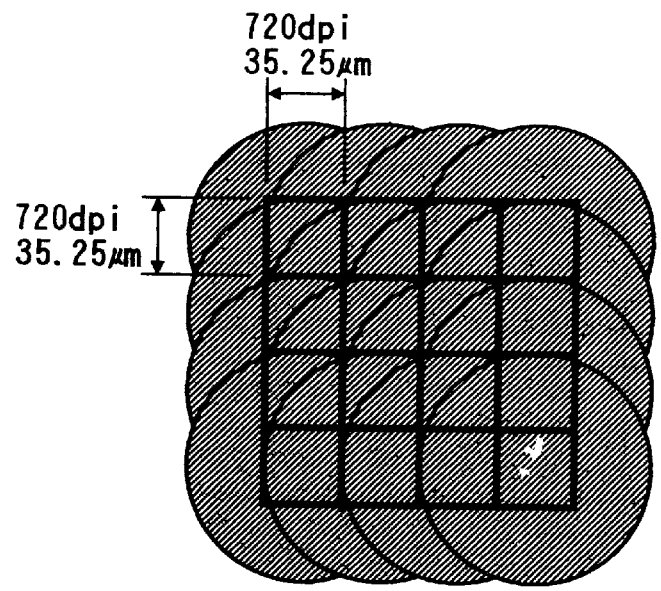
Figure 2:
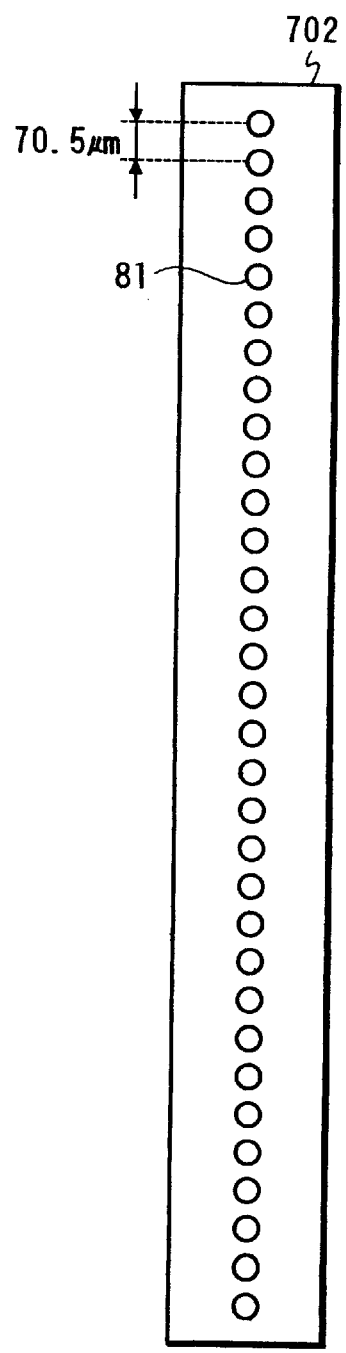
FIG. 2 schematically shows the ink discharge port surface of a recording head used in an embodiment of the present invention.

FIG. 2 schematically shows the arrangement of the ink discharge ports of a recording head used in this embodiment.

The recording head 80 shown is one corresponding to an image having resolvability or resolution of 360 dpi. That is, the discharge ports 81 thereof are one-dimensionally arranged at density of 360 dpi, i.e., a pitch of about 70.5 µm. The amount of ink droplet discharged from each discharge port 81 is substantially constant, namely, about 25 pl/dot. Here, the discharge system of the recording head 702 is one which has a discharge heater for generating heat energy, and utilizes the generated heat energy to create an air bubble in ink, and discharges the ink by the pressure of the air bubble.

FIG. 3 is a perspective view schematically showing the construction of a printer which effects recording on the surface of paper by using the recording head shown in FIG. 2 for each of inks of four colors.

Recording heads 702 corresponding to inks of four colors are arranged in the scanning direction thereof. The respective recording heads have integrally mounted thereon ink tanks containing therein black, cyan, magenta and yellow inks, respectively, whereby ink jet cartridges 701 are constituted.

On the downstream side of the scanning area of the ink jet cartridges 701 on the conveyance path for recording paper 707, there are provided a paper feeding roller 703 and an auxiliary roller 704, and the paper feeding roller 703 is rotatively driven in the direction of arrow by a driving mechanism, not shown, whereby the recording paper 707 is suitably conveyed in the direction of arrow y. Also, on the upstream side on the conveyance path, there are provided a pair of paper supplying rollers 705, which are rotatively driven by a driving mechanism, not shown, whereby the recording paper 707 can be supplied. By the rotational speed of the paper supplying rollers 205 being made smaller than that of the paper feeding roller 703, predetermined tension is made to act on the recording paper 707 between these rollers.

The four ink jet cartridges 701 are carried on a carriage 706, whereby the above-described scanning becomes possible. That is, the carriage 706 is provided so as to be moved by a driving mechanism, not shown, while being guided along a guide shaft 708. The carriage 706 is adapted to wait at a home position (h) indicated by broken line when recording is not being effected or when the recovery work or the like of the multi-head is effected.

In the above-described construction, the carriage 706 lying at the home position h before recording is started starts scanning when there is a recording start command. That is, the ink is discharged from the discharge ports 81 of the recording head 702 of each color in conformity with the discharge data while the carriage is being moved in the direction of arrow x, whereby recording is effected on the recording paper 707 with the arrangement width of the discharge ports 81. When the scanning up to the end portion of the recording paper is terminated, the carriage 706 has its direction of movement reversed and is returned to the home position side, whereafter it again effects the scanning in the direction of arrow x. In the case of reciprocal recording, the carriage effects recording also when it is returned to the home position side. In the above-described recording operation, the recording paper 707 has been fed by a predetermined amount in the direction of arrow y by the paper feeding roller 703 by the time from after the scanning in the direction of arrow x has been terminated until the next scanning in the direction of arrow x or the scanning in the opposite direction is begun, and the scanning of the recording heads 702 and the paper feeding are thus repeated, whereby recording is effected on the recording paper 707.

The ink jet recording apparatus according to the present embodiment is designed to effect recording at three resolvabilities, 360 dpi×360 dpi, 360 dpi×720 dpi and 720 dpi×720 dpi. However, each of the recording heads used in the present embodiment is one of which the discharge port pitch corresponds to the resolvability of 360 dpi as described above in connection with FIG. 2, and comprises 64 discharge ports (not all of which are shown in FIG. 2 for simplification). Therefore, it cannot record an image of 720 dpi×720 dpi by one cycle of recording scanning. Accordingly, in the present embodiment, in the recording of this resolvability, paper feeding of (n+½)×70.5 µm (n being an integer) is effected by one cycle of paper feeding and therewith, the discharge timing accompanying the movement of the carriage is also made to correspond to 720 dpi, whereby recording is effected at the resolvability of 720 dip×720 dpi. Such a recording method is not peculiar to the present embodiment, but is similar to the method already described with regard to the prior art.

The recording at the resolvability of 360 dpi×720 dpi can be realized by changing only the discharge timing as described above.

Figure 4A:
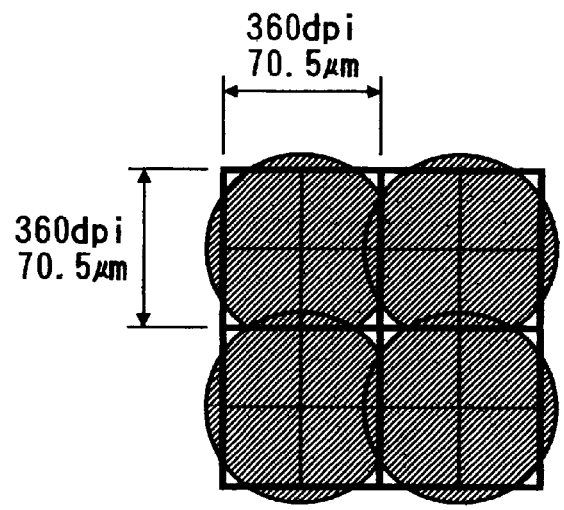
FIGS. 4A, 4B and 4C show comparative examples for illustrating the number of recorded dots at each resolvability of an embodiment of the present invention.
Figure 4B:
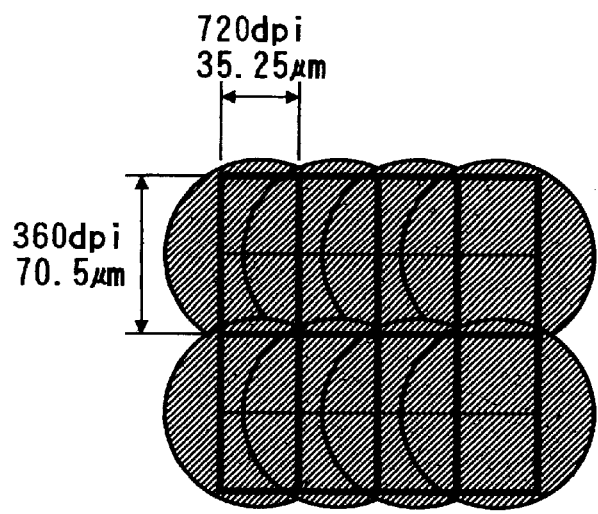
Figure 4C:
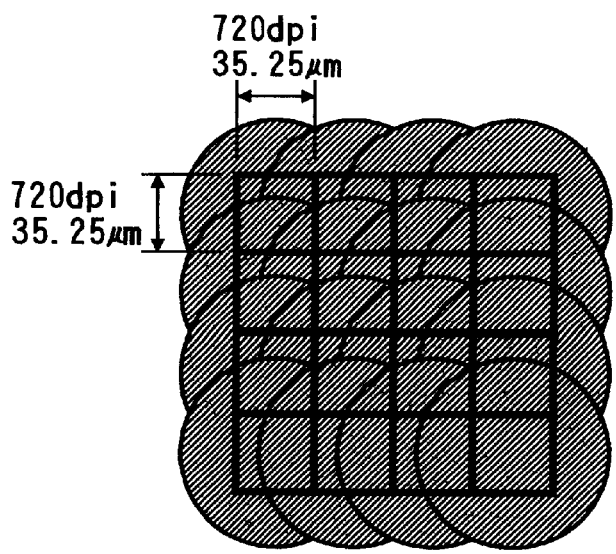
Figure 6:
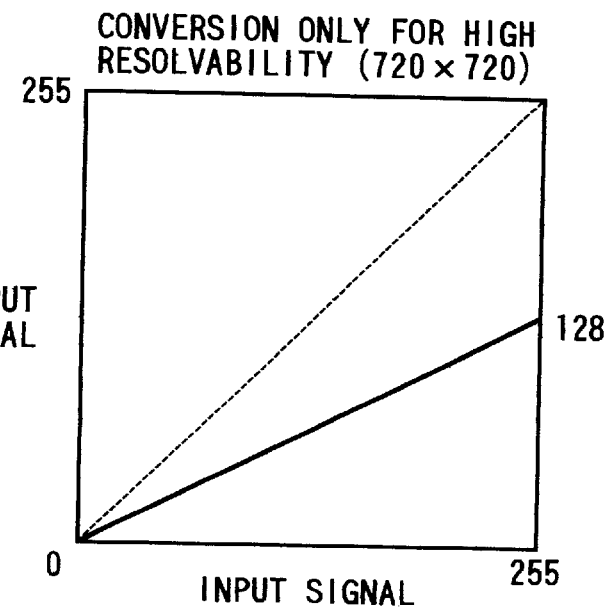
FIG. 6 is a graph showing signal value correction in the high resolvability mode in the processing shown in FIG. 5.

In any of the above-described three resolvability modes, the amount of ink discharge is 25 pl, and FIGS. 4A, 4B and 4C show states in which at this predetermined discharge amount, recording has been effected on plain paper with respective resolvabilities.

FIG. 4A shows a case where a dot has been recorded in each pixel of 360 dpi×360 dpi. In this case, it may happen that the image area cannot be fully covered with ink dots and desired density is not obtained.

On the other hand, FIGS. 4B and 4C show cases where a dot has likewise been formed in respective pixels of 360 dpi×720 dpi and 720 dpi×720 dpi. In these cases, the image area can be completely covered with ink dots. However, as previously described, depending on the kind of the recording paper (recording medium) used, there is a case where when the number of dots is uniformly determined in conformity with resolvability, the ink becomes excessive and an ill effect such as blur appears. Such an ill effect may become more remarkable when secondary colors (mixed colors) are recorded.

An appropriate amount of ink placement is determined chiefly by the ink absorbing property of the recording medium and the components of the ink. It is to be understood, for example, in the recording apparatus according to the present embodiment that when plain paper is used, it is an appropriate amount of placement to place the ink into pixels of 360 dpi×360 dpi (70.5 µm square) within a range of about 40 pl to 80 pl. That is, it means that unless dots are recorded on this area at 40 pl or greater, the surface of the paper cannot be fully covered and density becomes deficient, while on the other hand, if dots are recorded at an amount greater than 80 pl, the blur or the like of the ink may occur.

It is desirable that this appropriate amount of ink placement per predetermined area be maintained at every resolvability, and in plain paper, it is 40–80 pl per area of 70.5 µm square. Accordingly, as regards the three resolvabilities shown in FIGS. 4A, 4B and 4C in the case shown in FIG. 4A, 25 to 50 pl for the above-mentioned area, and this means deficient density, and in the case shown in FIG. 4B, 50 to 100 pl and this means somewhat excessive density, and in the case shown in FIG. 4C, 100 to 200 pl, and this means excessive density. Accordingly, in these cases, it is not appropriate in terms of the dignity of image to record a dot always in a pixel at each resolvability. Therefore, in the present embodiment, there is carried out the process of recording more than one dot in a pixel at low resolvability, and thinning dots in several pixels at high resolvability.

Table I below illustrates the number of recorded dots at each resolvability in an embodiment of the present invention, and shows the dot recording conditions at each resolvability satisfying the above-mentioned optimum range of discharge amount. More specifically, it shows the average number of recorded dots as the number of dots necessary to place 40 pl which is the minimum discharge amount in the above-mentioned range into 70.5 µm square by the head of the present embodiment of which the discharge amount is 25 pl the number of dots actually recorded for a discharge datum, and the reduction rate of the discharge data necessary to apparently achieve the above-mentioned average number of recorded dots by the above-mentioned number of actually recorded dots.

That is, actually, the amount of an ink droplet is a predetermined amount, 25 pl and there is no number of dots less than the decimal place for each pixel. So, for a discharge datum, the number of dots obtained by raising the above-mentioned average number of recorded dots to a unit is regarded as the above-mentioned number of actually recorded dots. However, when this number of actually recorded dots is recorded in each pixel, the ink may become excessive particularly when two discharge data correspond to each other due to the mixture of colors or the like and therefore, the number of dots is thinned, whereby the above-mentioned average number of recorded dots is satisfied by an entire image. Accordingly, in order to carry out the above-described thinning, the recording data is subjected to processing and as a result, the number of discharge data is reduced. Thereby, when recording is actually done, the above-mentioned integer dots are recorded, whereby an appropriate amount of ink placement can be obtained.

TABLE I

| resolvability | average number of recorded dots(dot/pixel) d | number of actually recorded dots D | reduction rate of data value R = d/D |
|---|---|---|---|
| 360 dpi × 360 dpi | 40 pl/25 pl = 1.6 | 2 dots | 0.8 |
| 360 dpi × 720 dpi | 40 pl/2/25 pl = 0.8 | 1 dot | 0.8 |
| 720 dpi × 720 dpi | 40 pl/4/25 pl = 0.4 | 1 dot | 0.4 |

Figure 8:
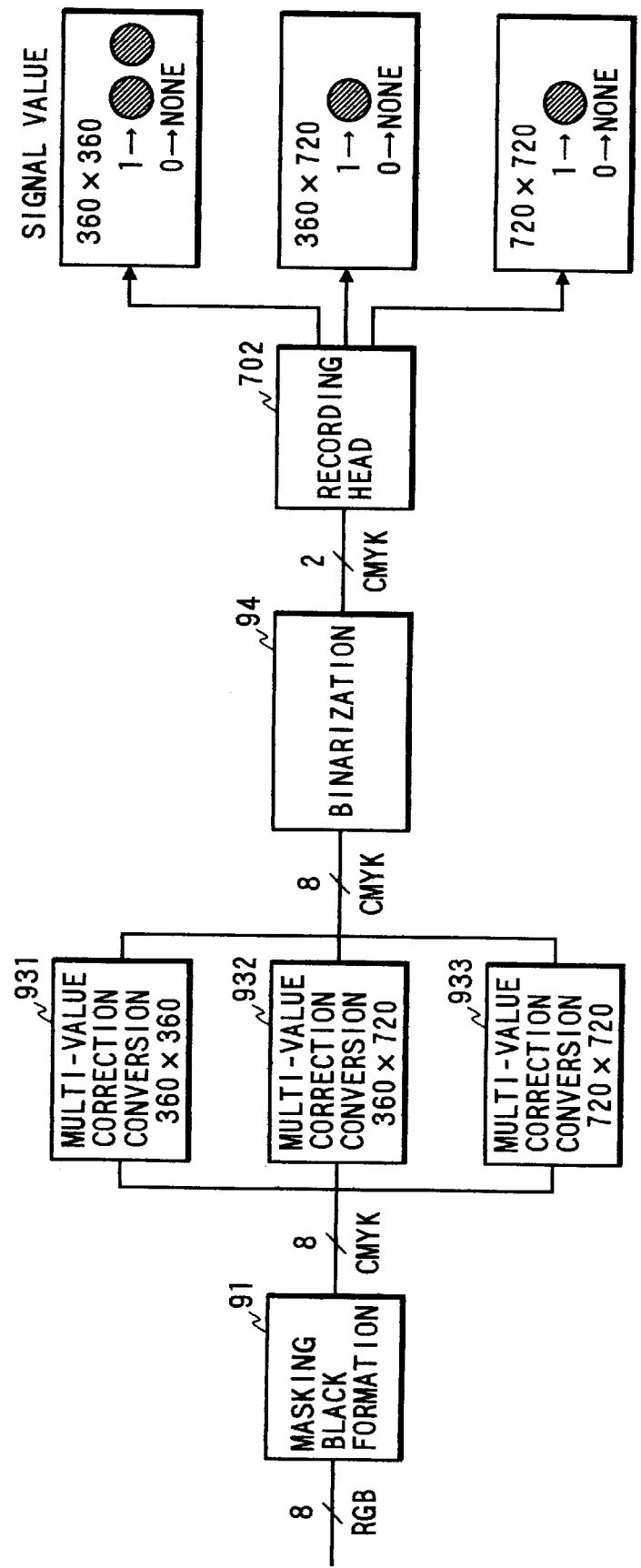
FIG. 8 is a block diagram showing a construction for data processing according to the first embodiment of the present invention.

FIG. 5 is a block diagram showing the concept of the data reducing process. Multivalue density data of 8 bits outputted from a printer gamma correction table 62 is subjected to predetermined conversion by a conversion table only for high resolvability 63 before it is binarized. Originally, conversion indicated by broken lines in FIG. 8 is effected, whereas by said predetermined conversion, the value of an output signal is reduced to about ½ of an input signal in the high resolvability mode. Thereby, the number of decoded pixels after binarization also becomes about a half of that in the ordinary mode, and it becomes possible to prevent any blur on the recording medium.

As another technique of carrying out the above-described process, there is a method of applying a mask to the data after binarization and thinning the recording data. A 50% mask indicated by the reference numeral 1102 is applied to data of 4×4 pixels designated by the reference numeral 1101 in FIG. 7. In the mask 1102, portions painted out in black are pixels which are not masked, and white portions are pixels which are masked. The result of this mask becomes as indicated by the reference numeral 1103, and as in the method described with reference to FIG. 5, there is obtained the effect of reducing the number of recorded pixels by half.

Figure 7:
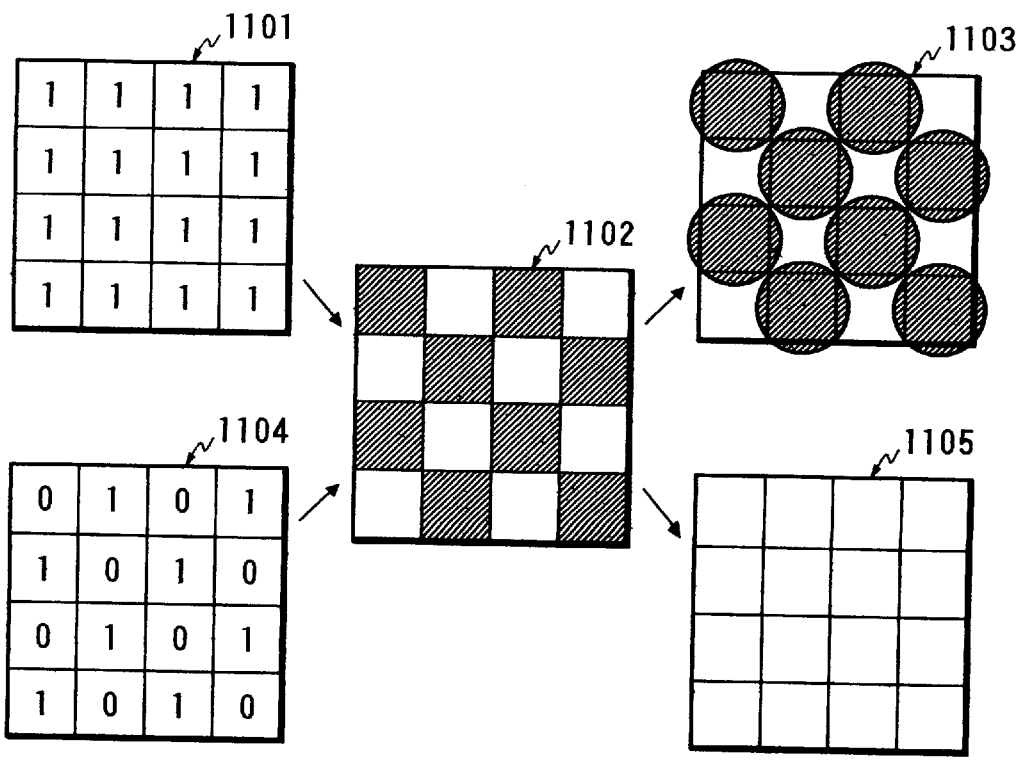
FIG. 7 illustrates processing utilizing a mask according to a method discrete from the data correcting method according to an embodiment of the present invention.

However, when processing is thus done by the use of a predetermined mask, for example, when data indicated by the reference numeral 1104 in FIG. 7 is inputted, there is the possibility that an ill effect such as the absence of data as indicated by the reference numeral 1105 in FIG. 7 may occur. As described above, an appropriate mask becomes different depending on by what technique (dither) of binarization the input data has been processed and therefore, it is difficult to set a mask capable of coping with all dithers. A method of creating a random mask would also occur to mind, but this method may apply a burden to the hardware which is the body to thereby reduce throughput and also cause irregularity peculiar to a random circuit.

Accordingly, to reduce the average number of dots per pixel in the case of the high resolvability mode, more conforming and reliable pixels can be obtained if as described with reference to FIG. 5, etc., the value is reduced at the stage of multi-value data, and then the binarizing process is carried out and during recording, the same number of dots are recorded in all the pixels.

As described above with respect to Table I, in the low resolvability mode, there is a case where a plurality of dots are recorded in a given area, but at the stage of multi-value data processing before binarization, it is not possible to make the number of dots correspond to the data of each pixel. Accordingly, when in order to record a plurality of dots in a pixel, the discharge data (the dot number data) thereof is to be increased, the process of increasing is carried out to the data after binarization.

In the present embodiment, as described with respect to Table I, the number of ink droplets (the number of recorded dots) discharged per pixel is determined in order to make the average ink discharge amount per pixel equal between the resolvabilities, and the data value is reduced to adjust the difference occurring between this number and the above-mentioned average ink discharge amount and in that case, the reduction in the data value is effected in advance at the stage of multi-value data.

Figure 9:
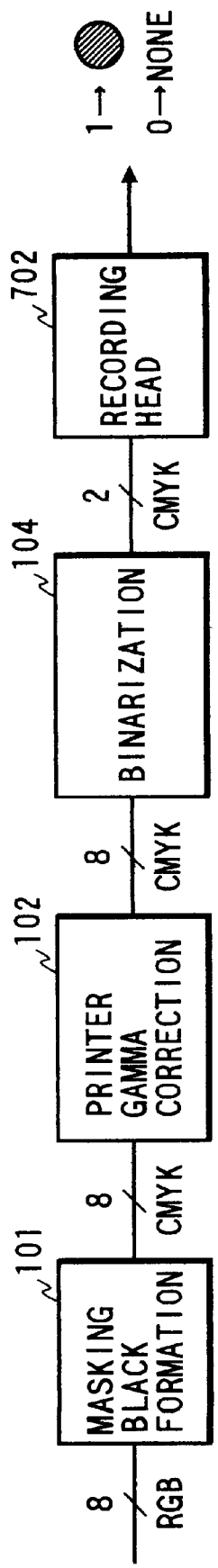
FIG. 9 is a block diagram showing a construction for data processing according to the prior art.

FIG. 8 is a block diagram showing the construction of image processing in the present embodiment, and FIG. 9 is a similar block diagram according to the prior art. The image processing in the present embodiment will hereinafter be described while being compared with the construction of the prior art.

Usually, density data of multi-value (here, 8 bits and 256 tones) sent with respect to respective ones of three primary colors R, G and B (red, green and blue) are converted into multi-value data of four colors CMYK by masking conversion and black formation 91.

In the prior art, as shown in FIG. 9, primary conversion is effected on this multi-value data by a printer gamma correction circuit 102, whereafter the finalizing process is carried out by a binarizing circuit 104 on the basis of a predetermined technique. The binarized data of four colors is transmitted as discharge data to the recording head 702. Thereby, in the recording head 702, the driving for either discharging or not discharging an ink droplet to a pixel is effected.

Figure 10A:
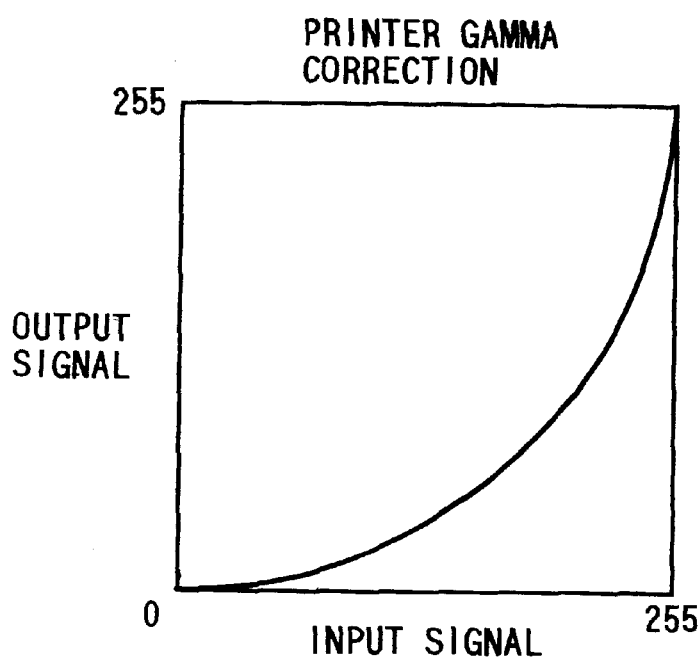
FIGS. 10A and 10B are graphs illustrating printer gamma correction.
Figure 10B:
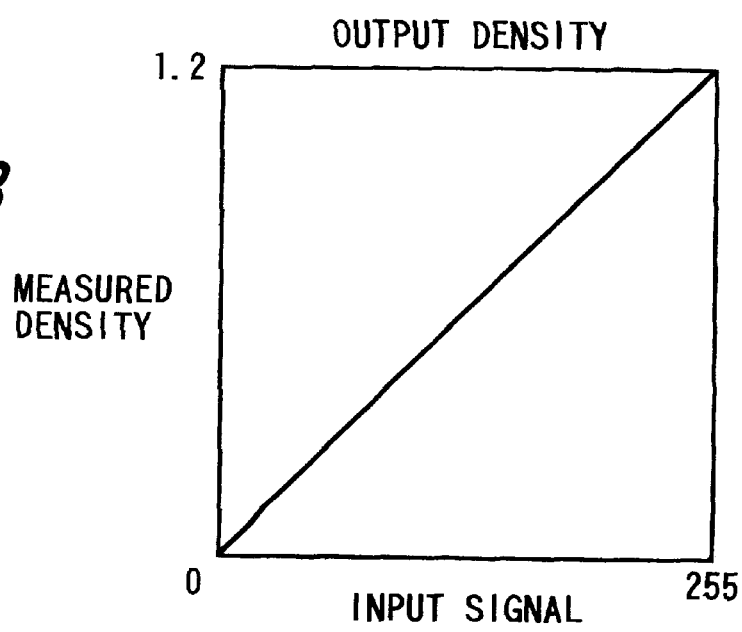

Here, printer gamma correction is to convert an input signal value into an output signal usually describing a curve as shown in FIG. 10A with a view to obtain output image density proportional to the input signal value, as shown in FIG. 10B. In this conversion, such conversion that prevents the output density in an area of a high input value from reading the top and decreases the output density for the input value of a half-tone area to obtain a linear output is effected.

Figure 11A:
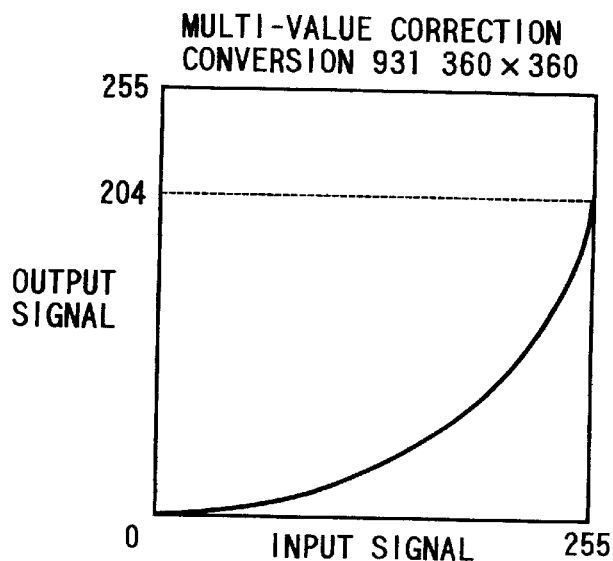
FIGS. 11A, 11B and 11C are graphs illustrating multi-value correction conversion for each resolvability in the first embodiment.
Figure 11B:
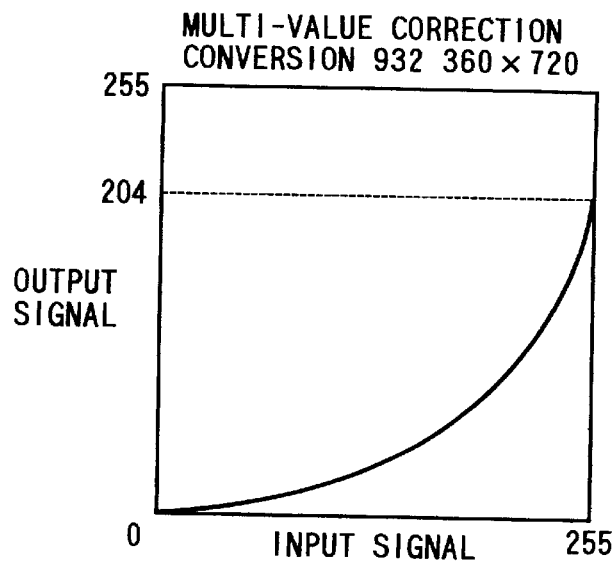
Figure 11C:
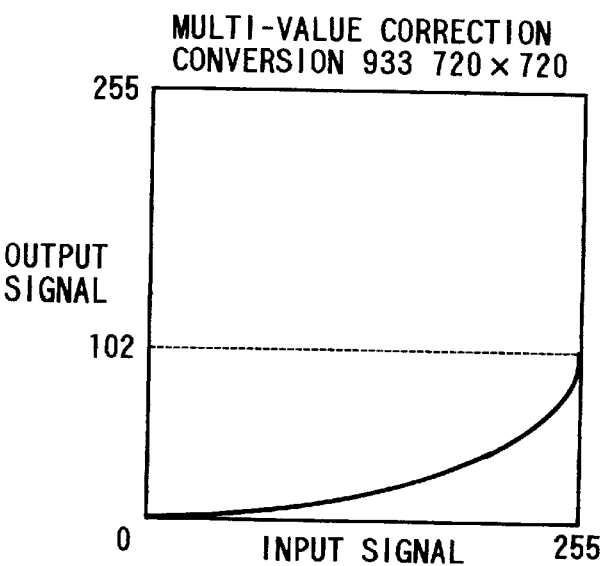

In the image processing in the present embodiment, as shown in FIG. 8, the data processed by a masking black formation circuit 91 is subjected to predetermined processing in a multi-value correction conversion circuit without passing a printer gamma correction circuit, but multi-value correction conversion circuits 931 to 933 for respective resolvabilities effect a reduction in the density value as described in connection with FIG. 5 and also effect printer gamma correction. That is, the multi-value correction conversion circuits 931 to 933, as shown in FIGS. 11A, 11B and 11C, respectively, output a value conforming to the multi-value data reduction rate illustrated in Table I and also effect printer gamma correction on that output. More particularly, the multi-value correction conversion circuits 931 and 932 corresponding to the resolvabilities of 360 dpi×360 dpi and 360 dpi×720 dpi effect conversion for reducing the output density by 80% relative to usual printer gamma correction, and the circuit 933 corresponding to the resolvability of 720 dpi×720 dpi effects conversion for reducing the output density by 40% relative to usual printer gamma correction.

After such signal value conversion has been effected, the same binarizing process is carried out at each resolvability and a binary signal is transferred to the recording head 702. As described in connection with FIG. 5, printer gamma correction and the correction conversion of each resolvability may be provided independently of each other, but in any case, the signal inputted to the binarizing process assumes the same value.

Next, in the driving for the ink discharge of the recording head, as described with respect to Table I, the number of dots made to correspond to "1" of the binary signal differs depending on the resolvability and particularly, for 360 dpi×360 dpi, drive control is effected to make two dots, i.e., two discharge signals, correspond to the binary signal "1" of a pixel. When the resolvabilities are 360 dpi×720 dpi and 720 dpi×720 dpi, a dot is recorded in each one pixel. Thus, by the combination of the data reduction during the correction conversion for multi-value data and this recording, there is obtained the average number of recorded dots shown in Table I at each resolvability and thus, "40–80 pl per 70.5 μm square" is satisfied at all resolvabilities.

As described above, according to the present embodiment, the number of recorded dots is reduced by the multi-value data before binarization and at the same time, the recorded dots are changed to integer times the recorded pixels after binarization, whereby an appropriate amount of ink placement can be maintained. Also, in the present embodiment, particularly when in the low resolvability mode wherein the recorded dot becomes small relative to a pixel, the density becomes deficient when a dot is recorded in a pixel, while on the other hand, an appropriate amount of ink placement is not obtained in the recording of dots integer times as many, such as two dots for which blur occurs in the boundary, appropriate recording can be effected.

(Second Embodiment)

As a second embodiment, description will hereinafter be made of a recording method in which the appropriate amount of ink placement differs depending on the recording medium.

Table II below illustrates the recording data correction according to the second embodiment, and like Table I, it shows the appropriate amounts of ink placement and the average number of recorded dots conforming thereto, the number of dots recorded by the head and the multi-value data reduction rate when 360 dpi×360 dpi has been recorded on various recording mediums by the recording apparatus used in the above-described first embodiment. Here, the recording mediums are, in addition to the plain paper used in the first embodiment, coated paper, OHP paper and special coated paper (SP coated paper).

It is to be understood that in the case of plain paper, a single color 40 pl is an appropriate amount for 70.5 μm square, whereas in the cases of coated paper, OHP paper and special coated paper, 50 pl, 60 pl and 70 pl, respectively, are judged to be appropriate amounts. At this time, the average number of recorded dots, etc. on each recording medium in the present embodiment wherein a droplet is 25 pl are as shown in Table II.

Again in such a case, if recording is done in accordance with a correction table having a reduction rate for each recording medium shown in Table II and the number of actually recorded dots, an appropriate image of an appropriate amount of ink placement will be obtained even at the same resolvability for each different recording medium.

Further, similar tables in which such control conforming to the recording medium and the control for each resolvability described in the first embodiment are combined together are shown in Tables III and IV below.

By appropriate signal value conversion being thus effected for each recording resolvability and each recording medium, good images can always be realized in every case.

While in each of the above-described embodiments, the correction table has been shown as being individually provided for each resolvability or each recording medium, the modes in which the correction rates are the same may use the same table.

TABLE II 360 dpi × 360 dpi

| resolvability | appropriate amount of ink placement (pl/70.5 × 70.5 μm) | average number of recorded dots (dot/pixel) d | number of actually recorded dots D | reduction rate of data value R = d/D |
|---|---|---|---|---|
| plain paper | 40 | 40 pl/25 pl = 1.6 | 2 dots | 0.8 |
| coated paper | 50 | 50 pl/25 pl = 2.0 | 2 dots | 1.0 |
| OHP paper | 60 | 60 pl/25 pl = 2.4 | 3 dots | 0.8 |
| SP coated paper | 70 | 70 pl/25 pl = 2.8 | 3 dots | 0.93 |

TABLE III 360 dpi × 720 dpi

| resolvability | appropriate amount of ink placement (pl/70.5 × 70.5 μm) | average number of recorded dots (dot/pixel) d | number of actually recorded dots D | reduction rate of data value R = d/D |
|---|---|---|---|---|
| plain paper | 40 | 40 pl/2/25 pl = 0.8 | 1 dot | 0.8 |
| coated paper | 50 | 50 pl/2/25 pl = 1.0 | 1 dot | 1.0 |
| OHP paper | 60 | 60 pl/2/25 pl = 1.2 | 2 dots | 0.6 |
| SP coated paper | 70 | 70 pl/2/25 pl = 1.4 | 2 dots | 0.7 |

TABLE IV 720 dpi × 720 dpi

| resolvability | appropriate amount of ink placement (pl/70.5 × 70.5 μm) | average number of recorded dots (dot/pixel) d | number of actually recorded dots D | reduction rate of data value R = d/D |
|---|---|---|---|---|
| plain paper | 40 | 40 pl/4/25 pl = 0.4 | 1 dot | 0.4 |
| coated paper | 50 | 50 pl/4/25 pl = 0.5 | 1 dot | 0.5 |
| OHP paper | 60 | 60 pl/4/25 pl = 0.6 | 1 dot | 0.6 |
| SP coated paper | 70 | 70 pl/4/25 pl = 0.7 | 1 dot | 0.7 |

(Third Embodiment)

As a third embodiment, description will hereinafter be made of a case where the correction of the amount of ink placement hitherto described is effected differently for each color. That is, the purpose of each of the above-described embodiments has been to adjust the sum total of the amounts of ink placement at respective resolvabilities so as to be appropriate for the recording medium, while in this embodiment, it is also the purpose to simply adjust the color balance for each recording medium, in addition to this. Therefore, this embodiment adopts a method of making the number of recorded dots and the correction rate of the multi-value data differ for each color.

Usually, the color balance is corrected to a proper value at the stage of multi-value data by the color correcting process or the like. In the case of 8-bit data, however, it is impossible to make the value thereof greater than 255 and therefore, the adjustment of the color balance is effected in a direction to decrease the data value. For example, it is ideal that blue is obtained by recording cyan and magenta in the same amounts, but let it be assumed that in the recording apparatus of the present embodiment, the color is inclined toward magenta. In this case, it is necessary to incline the balance between the recorded amounts of the two colors toward the cyan side, but by the above-described multi-value conversion of masking, the amount of magenta can be decreased, but the amount of cyan cannot be increased. Also, when like the printer of the present embodiment, an apparatus corresponds to a plurality of resolvabilities, the density may become deficient in the low resolvability mode as described above unless the amount of cyan ink is increased.

Accordingly, in the present embodiment, the balance is adjusted while a plurality of cyan dots are recorded in a pixel. That is, in this case, recording scanning is effected twice or more often for all of cyan recorded pixels when recording is done with the data after binarization. However, by the above-described method alone, delicate adjustment of the balance cannot be accomplished although the balance can be roughly adjusted by emphasizing cyan to two or three times as much as magenta. So, in the present embodiment, simultaneously with the above-described method, at the stage of multi-value data, correction for decreasing the data value is also effected.

Table V below illustrates the recording data correction according to the third embodiment of the present invention, and shows the appropriate amount of ink placement of each ink color for adjusting the color balance on plain paper under the resolvability of 360 dpi×360 dpi of the present embodiment, and the average number of recorded dots, the number of head recorded dots and the reduction rate of multi-value data conforming thereto. In Table V, the appropriate amount of ink placement of each color keeps the balance between the respective colors, while the total value of the colors is the same as that in each of the embodiments hitherto described.

It lacks accuracy to effect such conversion for each color, as compared with a case where color correction is effected by precise image processing calculation, but rough correction can be processed at high speed and also, it can be relatively simply realized to provide a recording mode independently for each resolvability and each recording medium and apply appropriate correction thereto.

TABLE V 360 dpi × 360 dpi plain paper

| resol-vability | appropriate amount of ink placement (pl/70.5 × 70.5 μm) | average number of recorded dots (dot/pixel) d | number of actually recorded dots D | reduction rate of data value R = d/D |
|---|---|---|---|---|
| black | 45 | 45 pl/25 pl = 1.8 | 2 dots | 0.9 |
| cyan | 50 | 50 pl/25 pl = 2.0 | 2 dots | 1.0 |
| magenta | 25 | 25 pl/25 pl = 1.0 | 1 dot | 1.0 |
| yellow | 40 | 40 pl/25 pl = 1.6 | 2 dots | 0.8 |

While the above embodiments have been described with respect to a case where use is made of a recording head of the ink jet type, the present invention is not restricted to the above-described type from the viewpoint of the dignity of image, but it is apparent that the present invention can also be applied to a apparatus using a recording head of other type such as the heat transfer type or the like.

The present invention brings about excellent effects particularly in a recording head of the bubble jet system, among various ink jet recording systems.

As to its representative constitution and principle, for example, one practiced by the use of the basic principle disclosed in U.S. Pat. Nos. 4,723,129 and 4,740,796, is preferred. This system is applicable to either of the so-called on-demand type and the continuous type. Particularly, the case of the on-demand type is effective because, by applying at least a driving signal which gives rapid temperature rise exceeding nucleate boiling corresponding to the recording information on electrothermal converters arranged correspondingly to sheets or liquid channels holding liquid (ink), heat energy is generated at said converters to induce film boiling on the heat acting surface of the recording head, and consequently bubbles can be formed in the liquid corresponding one to one to the driving signals. By discharging the liquid through an opening by the growth and shrinkage of the bubble, at least one droplet is formed. By making the driving signals into pulse shapes the growth and shrinkage of the bubble can be effected instantly and adequately to accomplish more preferably discharge of the liquid particularly excellent in response characteristics. As the driving signals of such pulse shape, those as disclosed in U.S. Pat. Nos. 4,463,359 and 4,345,262 are suitable. Furthermore, excellent recording can be performed by employment of the conditions described in U.S. Pat. No. 4,313,124 concerning the temperature rise rate of the above-mentioned heat acting surface.

As to the constitution of the recording head, in addition to the combinations of discharge orifice, liquid channel, electrothermal converters (linear liquid channel or right angle liquid channel) as disclosed in the above-mentioned patents, the constitution by the use of U.S. Pat. No. 4,558,333 or U.S. Pat. No. 4,459,600 disclosing the constitution having the heat acting portion arranged in the flexed region is also covered by the present invention. In addition, in the present invention, there may be effectively applied the constitution as disclosed in Japanese Laid-Open Patent Application No. 59-123670 which discloses a constitution using a slit common to plural electrothermal converters as the discharging portion therefor or Japanese Laid-Open Patent Application No. 59-138461 which discloses a constitution having an opening for absorbing pressure wave of heat energy, communicating with the discharging portion.

Furthermore, as the recording head of the full line type having a width corresponding to the maximum recordable width of the recording medium, there may be employed either a constitution which satisfies its length by combination of plural recording heads as disclosed in the above-mentioned publications or a constitution formed by an integral recording head, and the present invention can exhibit the above-mentioned effects effectively.

In addition, the present invention is effective for a recording head of the freely exchangeable chip type which enables electrical connection to the main device or supply of ink therefrom upon being mounted on said main device, or for a recording head of the cartridge type, integrally including an ink tank.

Also, the addition of restoration means, auxiliary means etc., for the recording head is preferable, because the effects of the present invention can be further stabilized. Specific examples of such means include capping means, cleaning means, pressurization or aspiration means, heating or preheating means for the recording head, and these may be employed in suitable combinations. It is also effective to effect preliminary recording mode, which performs ink discharge not intended for recording, for achieving stable recording operation.

Furthermore, as the recording mode of the recording apparatus, the present invention is extremely effective not only for the recording of a primary color such as black, but also for the recording with one of plural different colors or with full colors by color mixing, regardless whether there is employed an integrally constructed head or plural heads in combination.

Furthermore, the ink jet recording apparatus of the present invention may be employed, not only as an image output terminal for an information processing apparatus such as a computer, but also as a copying machine in combination with an image reader, or a facsimile apparatus with transmitting and receiving functions.

As described above, according to the present invention, discharge data is produced in relation to the reduction rate of multi-value density data and therefore, the amount corresponding to a decrease in the data value can be made up for by the number of dots recorded, whereby for example, the number of dots can be changed in conformity with the size of a pixel changed by the resolvability and also, a uniform amount of ink imparted per unit area can be maintained even if the resolvability changes.

As a result, irrespective of any change in the resolvability, etc., it becomes possible to record images of high dignity at all times.

What is claimed is:

1. A recording apparatus using a recording head to effect recording on a recording medium, comprising:

multi-value correction conversion means for reducing the value of multi-value density data at a predetermined reduction rate;

binarizing means for binarizing the multi-value density data of which the value has been reduced by said multi-value correction conversion means; and head drive control means for forming discharge data of said recording head in relation to the predetermined reduction rate by said multi-value correction conversion means, on the basis of the binarized data obtained by said binarizing means, wherein the predetermined reduction rate is so determined that an ink applying amount per a unit area on the recording medium is a predetermined amount corresponding to at least one of the resolution, a kind of the recording medium and a color of ink.

2. A recording apparatus according to claim 1, wherein said recording head is a recording head of the ink jet type and has a heat energy generating member for generating heat energy.

3. A recording apparatus according to claim 1, which can effect recording at a plurality of resolutions and wherein the reduction rate by said multi-value correction conversion means is determined correspondingly to respective ones of said plurality of resolutions.

4. A recording apparatus according to claim 1, which can effect recording on a plurality of kinds of recording mediums and wherein the reduction rate by said multi-value correction conversion means is determined correspondingly to respective ones of said plurality of kinds of recording mediums.

5. A recording apparatus according to claim 1, which can effect recording in a plurality of colors and wherein the reduction rate by said multi-value correction conversion means is determined correspondingly to respective ones of said plurality of colors.

6. A recording apparatus according to claim 3, wherein said multi-value correction conversion means determines the reduction rate correspondingly to the respective resolutions so that the amount of ink imparted per unit area may become equal among said plurality of resolutions.

7. A recording apparatus according to claim 4, wherein said multi-value correction conversion means determines the reduction rate correspondingly to the ink absorbing property of each of said plurality of kinds of recording mediums.

8. A recording apparatus according to claim 5, wherein said multi-value correction conversion means determines the reduction rate correspondingly to respective ones of said plurality of colors to adjust the color balance among said plurality of colors.

9. An ink jet recording method of effecting recording on a recording medium by the use of a recording head discharging ink, comprising the steps of:

finding the capable number of dots per predetermined area on the recording medium in conformity with at least one of resolution, the kind of the recording medium and the color of the ink on the basis of the amount of ink discharged from said recording head per one discharge;

finding the actual number of dots recordable by said recording head from said found number of recorded dots; and reducing the value of recording data to adjust the difference between said actual number of recorded dots and said capable number of dots.

10. An ink jet recording method according to claim 9, wherein said recording head is a recording head of the ink jet type and has a heat energy generating member for generating heat energy.

* * * * *

UNITED STATES PATENT AND TRADEMARK OFFICE
CERTIFICATE OF CORRECTION

PATENT NO. : 5,980,012
DATED : November 9, 1999
INVENTOR(S) : FUJITA ET AL.

Page 1 of 2

It is certified that error appears in the above-identified patent and that said Letters Patent is hereby corrected as shown below:

On the title page item,
[57] ABSTRACT:
  Line 2, "dignity" should read --quality--.

COLUMN 2:
  Line 19, "dignity" should read --quality--.

COLUMN 3:
  Line 14, "if" should read --if,--.

COLUMN 6:
  Line 29, "dignity" should read --quality--.
  Line 44, "pl the" should read --pl, the--.
  Line 51, "25 pl" should read --25 pl,--.

COLUMN 12:
  Line 1, "dignity" should read --quality--.
  Line 3, "a apparatus" should read --an apparatus--.
  Line 36, "right angle" should read --right-angle--.
  Line 64, "auxiliary means" should read --auxiliary means,--.

UNITED STATES PATENT AND TRADEMARK OFFICE
CERTIFICATE OF CORRECTION

PATENT NO. : 5,980,012
DATED : November 9, 1999
INVENTOR(S) : FUJITA ET AL.

It is certified that error appears in the above-identified patent and that said Letters Patent is hereby corrected as shown below:

COLUMN 13:
  Line 28, "dignity" should read --quality--.

Signed and Sealed this

Twenty-eighth Day of November, 2000

Attest:

Q. TODD DICKINSON

*Attesting Officer*    *Director of Patents and Trademarks*